Sept. 11, 1923.
H. H. LIBBING
1,467,863
FRUIT AND VEGETABLE PEELER
Filed Feb. 17, 1921
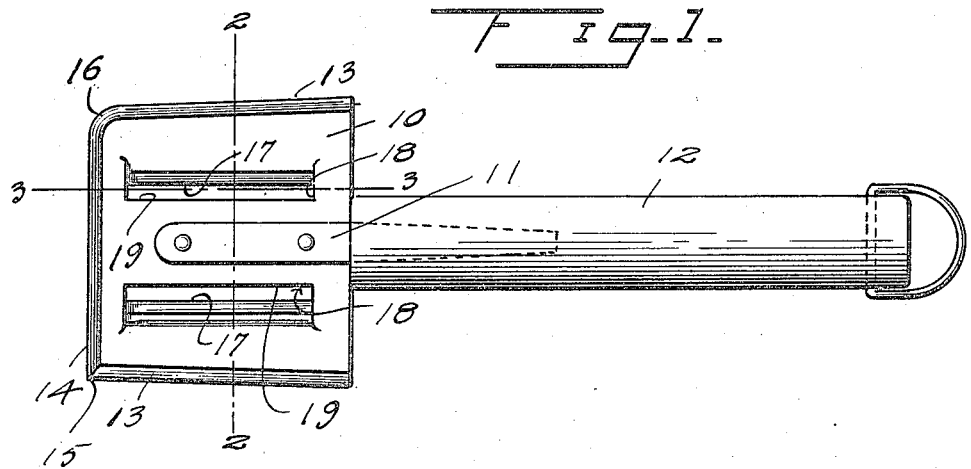
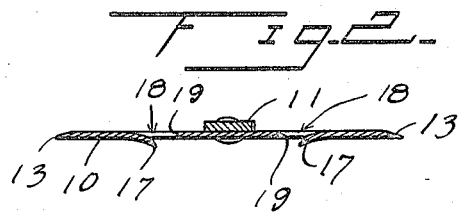
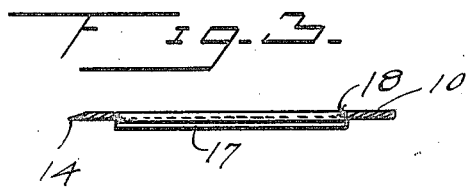
Inventor
H. H. Libbing
By ........... Attorney Patented Sept. 11, 1923.

1,467,863

UNITED STATES PATENT OFFICE.

HENRY H. LIBBING, OF SAN FRANCISCO, CALIFORNIA.

FRUIT AND VEGETABLE PEELER.

Application filed February 17, 1921. Serial No. 445,727.

*To all whom it may concern:*

Be it known that I, HENRY H. LIBBING, a citizen of the United States, residing at San Francisco, in the county of San Francisco and State of California, have invented certain new and useful Improvements in Fruit and Vegetable Peelers; and I do hereby declare the following to be a full, clear, and exact description of the invention, such as will enable others skilled in the art to which it appertains to make and use the same.

The object of the invention is to provide a simple and inexpensive device which may be operated manually, either by a right or left handed person in the peeling and pitting of fruit and vegetables under conditions providing for the removal of the skin without waste of the body of the fruit or vegetable and having means whereby the operation of peeling may be effected in depressions or irregularities of the surface of the object and eyes such as are ordinarily found in potatoes, etc., may readily be removed; and with these objects in view the invention consists in a construction and combination of parts of which a preferred embodiment is shown in the accompanying drawing, wherein:

Figure 1 is a side view of the implement embodying the invention.

Figure 2 is a transverse section on the plane indicated by the line 2—2 of Figure 1.

Figure 3 is a longitudinal section on the plane indicated by the line 33 of Figure 1.

The device consists essentially of a blade 10 to which by means of a shank 11 a suitable handle 12 is attached. The blade is provided with opposite side cutting edges 13, which, for convenience, may be termed exterior edges and with an end cutting edge 14 which at one end intersects one of the side edges to form an angle or point 15, suitably sharpened, to serve as a means of removing eyes and specks from fruit and vegetables and the like, the other end of the end edge being connected with the adjacent exterior side edge by a curve or arcuate cutting edge 16 suitable for operating in depressions or irregularities of the fruit or vegetable, either in removing skin or otherwise.

In addition to the exterior side and end edges the blade is provided with struck-out cutting members 17 having spacing cutting edges $17^a$. That portion of the blade located intermediate the cutting members 17 constitute a bar $17^b$. The deflection of cutting member 17 slightly from the plane of the plate adapts the opposite or inner edges of the slots to form guards 19 to limit the depth of cut of the edges $17^a$ which for this reason are peculiarly adapted for peeling fruit and vegetables under conditions tending to economize or avoid waste of the meat or body portion of the fruit or vegetable. The interior guarded edges are preferably, as shown, disposed parallel with the lateral exterior edges and may be used interchangeably therewith, either by a right handed or left handed person and either from or toward the body of the person, or in other words either by drawing or pushing, to the end that fruit and vegetables may be peeled and prepared for cooking with the utmost expedition and economy.

Having thus described the invention, what I claim is:—

A knife having a one-piece blade provided with struck-out portions constituting cutting members having their cutting edges facing each other, said cutting members being spaced apart whereby the intermediate portion of the blade constitutes a bar, and a handle-attaching shank disposed along and secured to said bar.

In testimony whereof I affix my signature in presence of two witnesses.

HENRY H. LIBBING.

Witnesses:
W. A. COOPER,
GEO. W. FLATLEY.